United States Patent [19]

Moad

[11] 4,398,081
[45] Aug. 9, 1983

[54] STAND-BY HEATING/POWER SUPPLY SYSTEM FOR A MOTOR VEHICLE

[75] Inventor: Mark H. Moad, P.O. Box 721, Phoenix, Ariz. 85001

[73] Assignee: Mark H. Moad, Phoenix, Ariz.

[21] Appl. No.: 199,974

[22] Filed: Oct. 23, 1980

[51] Int. Cl.³ .......................... H05B 1/02; H01J 9/00; B60L 1/10

[52] U.S. Cl. ........................... 219/202; 123/142.5 E; 165/41; 219/208; 219/279; 219/364; 237/2 A; 237/12.3 B; 307/41; 307/64

[58] Field of Search ................. 62/236; 219/202, 279, 219/208, 205, 305, 306, 364; 307/41, 64, 38; 165/41; 123/142.5 R, 142.5 E; 237/8 R, 8 A, 2 R, 2 A, 12.3 R, 12.3 B

[56] References Cited

U.S. PATENT DOCUMENTS

| | | | |
|---|---|---|---|
| 1,562,240 | 11/1925 | Melotti | 219/208 X |
| 1,928,513 | 9/1933 | Terrell | 123/142.5 E |
| 2,268,478 | 12/1941 | Fehrer | 219/202 X |
| 2,419,273 | 4/1947 | Marquette | 219/305 |
| 2,527,011 | 10/1950 | Keil | 219/202 X |
| 2,697,177 | 12/1954 | Burgess | 307/64 |
| 2,819,373 | 1/1958 | Allman | 219/202 |
| 3,072,176 | 1/1963 | Sunday . | |
| 3,131,864 | 5/1964 | Young | 219/202 X |
| 3,236,220 | 2/1966 | Holmes | 219/202 X |
| 3,264,450 | 8/1966 | Wallace | 219/279 |
| 3,300,619 | 1/1967 | Nilssen | 219/279 |
| 3,362,637 | 1/1968 | Cornell | 237/2 |
| 3,418,450 | 12/1968 | Schott | 219/279 |
| 3,690,549 | 9/1972 | Hardy | 237/2 A |
| 3,770,977 | 11/1973 | McIntosh | 307/41 |
| 3,868,060 | 2/1975 | Mitchell | 165/41 X |
| 3,870,855 | 3/1975 | Edlund et al. | 219/202 X |

FOREIGN PATENT DOCUMENTS 1914860  10/1970  Fed. Rep. of Germany ... 123/142.5

*Primary Examiner*—A. Bartis
*Attorney, Agent, or Firm*—LaValle D. Ptak

[57] ABSTRACT

A stand-by heating/power supply system for an emergency vehicle, such as an ambulance, has an auxiliary electric heater and pump connected in the conventional heater coolant line adjacent the upstream side of the rear heat exchanger normally employed in such a vehicle. A control unit is connected to supply operating power to this heater and pump and also to operate the heater fan independently of the standard fan control provided in the vehicle. The control unit, in turn, is supplied with operating power upon connection with a conventional residential alternating current power source and includes timer circuits and electronic switches to delay the turning on of the heater pump unit and the fan and other auxiliary electrical power supplies for a predetermined time period after the connection with the alternating power source is made. The time delays for turning on different ones of the utilization devices within the vehicle also is varied, so that no sudden power surge takes place.

7 Claims, 2 Drawing Figures

STAND-BY HEATING/POWER SUPPLY SYSTEM FOR A MOTOR VEHICLE

BACKGROUND OF THE INVENTION

Motor vehicles such as automobiles, trucks, ambulances, and other emergency vehicles generally employ internal combustion engines which are liquid or fluid cooled. In cold climates, a portion of the engine coolant is continuously recirculated through a heat exchanger located to communicate with the interior of the vehicle. A fan is provided to recirculate air within the vehicle interior over the heat exchanger to warm the interior of the vehicle. While such a vehicle is in operation, heaters of this type provide ample warmth, even in the coldest of climates.

When a motor vehicle is parked with the engine turned off for a period of time in cold weather, such as overnight, the engine block, accessories, and the interior of the vehicle generally attain the ambient temperature surrounding the vehicle. It is common to encounter substantial difficulty in starting the engine of such a vehicle in cold weather. In addition, a considerable time period often is required before the engine coolant reaches a temperature which is sufficiently high to permit adequate heating of the vehicle interior through the recirculating coolant heater to take place. Other disadvantages include the frosting of the vehicle windshield and inefficient operation of the engine until it has attained its desirable operating temperature.

In the case of emergency vehicles, the problem of permitting the interior of the vehicle to reach the very cold ambient temperatures in which the vehicle may be parked in northern climates goes beyond the problems mentioned above. Ambulances and fire department rescue vehicles all include basic medical equipment which does not function properly when it is extremely cold. Particularly, if intravenous solutions of various types are kept in the vehicle, it is necessary to maintain a temperature within the vehcle above the freezing point of the solutions to prevent their deterioration or destruction.

Consequently, it has been common, in the case of ambulances or similar emergency vehicles, to place an electric space heater within the vehicle whenever it is parked overnight or for a long period of time and to connect the heater to a suitable source of household alternating power current. Space heaters are available in sizes sufficiently large to maintain the interior of such an emergency vehicle or ambulance at least above the freezing point, so that the intravenous solutions and other medical products stored within the ambulance are not permitted to freeze or be subjected to sub-freezing temperatures. When a call is received, however, to require the services of the emergency vehicle, it is necessary, as a first step when such a heater is being used, to either unplug the heater and store it somewhere within the vehicle or remove the heater from the vehicle before departing. The heater, however, does not overcome the difficulties inherent in starting the engine of such an emergency vehicle; so that all of the problems which occur in conjunction with extremely cold weather starting are present whether or not such a separate auxiliary electric space heater is used.

Various proposals have been made in the past for heating the vehicle interior, the engine, and/or charging the battery of a vehicle when it is parked for a relatively long period of time in sub-freezing temperatures. One such solution is disclosed in the patent to Edlund et al, U.S. Pat. No. 3,870,855, issued Mar. 11, 1975. The Edlund patent discloses a combination battery charger, motor heater, and passenger compartment heater for a motor vehicle. The passenger compartment heater is a separate resistance electric heater with its own heating fan. An engine heater (apparently in the form of an oil pan heating probe) also is provided, and a central unit is connected to the household alternating current line for supplying heating current to the engine heater, operating current to the air heater, and charging current to the vehicle battery. A problem with the system disclosed in the Edlund patent is that a separate heater and fan unit is required apart from the conventional automobile heater and fan. In addition, a separate electric engine heater is required and a main voltage cable necessarily is located within the vehicle interior extending from the control unit to the heating elements of the additional electric heater.

A number of proposals have been made in the past for automobile preheaters or quick heat boosters which employ auxiliary liquid or gas fuel supplies, or which utilize a portion of the gasoline normally used to power the internal combustion engine. A serious fire hazard exists when systems of this type are employed because of the additional fuel tanks and because of the use of open heating flames to produce the desired auxiliary heat. Examples of this type of system, which all require substantial modification of the vehicle in which they are used, are shown in the patents to Young, U.S. Pat. Nos. 3,131,864, Sunday, 3,072,176, Hardy, 3,690,549, and Cornell, 3,362,637.

Other attempts to speed-up the application of heat to the vehicle interior after the vehicle is started are disclosed in the patents to Wallace, U.S. Pat. No. 3,264,450 and Nilssen, 3,300,619, which employs auxiliary electric quick heat coils for an automobile. These coils are turned off after the engine heats up. There is no provision in the systems disclosed in either of these patents, however, for providing stand-by heat to the interior of the vehicle or to its engine. The auxiliary heaters are utilized only during the time period after the engine first is started until a satisfactory heat level is attained in the interior of the automobile.

Another system to provide auxiliary heat to the interior of an automobile is disclosed in the patent to Schott, U.S. Pat. No. 3,418,450. This patent discloses a car heater and battery charger using an alternating current resistence heater connected to an external alternating current power supply. A separate heater is necessary in addition to the normal hot water heater which is standard in most vehicles.

Other systems have been proposed for providing a centralized boiler or heat source with auxiliary equipment in buses, or the like, to connect to the centralized heat source for maintaining an elevated interior temperature in the buses or similar vehicles during times when they are parked in cold weather.

It is desirable to provide auxiliary heater and power supply systems particularly suitable for use with ambulances and similar emergency vehicles for maintaining interior heat in the vehicle along elevating the temperature of the engine coolant and providing auxiliary electrical power for vehicle accessories, if desired, without being subject to the various disadvantages of the prior art discussed above.

SUMMARY OF THE INVENTION

Accordingly, it is an object of this invention to provide an auxiliary heater system for a motor vehicle.

It is another object of this invention to provide an auxiliary heater system for ambulances and emergency vehicles.

It is an additional object of this invention to provide an auxiliary stand-by power supply and heater system for motor vehicles.

It is a further object of this invention to provide an auxiliary heater and stand-by power supply system for motor vehicles, such as ambulances and emergency vehicles, which is quickly and easily connected to a source of alternating current power supply.

It is yet another object of this invention to provide an improved stand-by heating and power supply system for emergency vehicles which is simple to install, utilizes a minimum of additional components in the vehicle, and which may be readily connected and disconnected from a conventional source of alternating current power.

In accordance with a preferred embodiment of this invention, a stand-by heating/power supply system for an emergency vehicle operates in conjunction with the conventional recirculating fluid heating system provided in the vehicle. An auxiliary electrical heater and pump assembly is connected in series in the recirculating coolant line. An auxiliary electrical fan control is connected to the vehicle heater fan for operating the heater fan independently of the standard vehicle fan control and a control unit is placed in the vehicle with outputs coupled to the auxiliary electrical heater and pump assembly and to the heater fan. This control unit is adapted for connection with conventional residential alternating current power source located outside the vehicle.

More specific embodiments of the invention add electronic timer circuits and solid state switches in the control unit; so that when the power is first applied to the unit, a preestablished time delay exists before the heater and pump assembly is energized and the auxiliary fan control is energized. In more specific embodiments, auxiliary power supplies also are obtained from the control unit for maintaining auxiliary electrical equipment in the vehicle in a stand-by operating condition.

DETAILED DESCRIPTION

Figure 1:
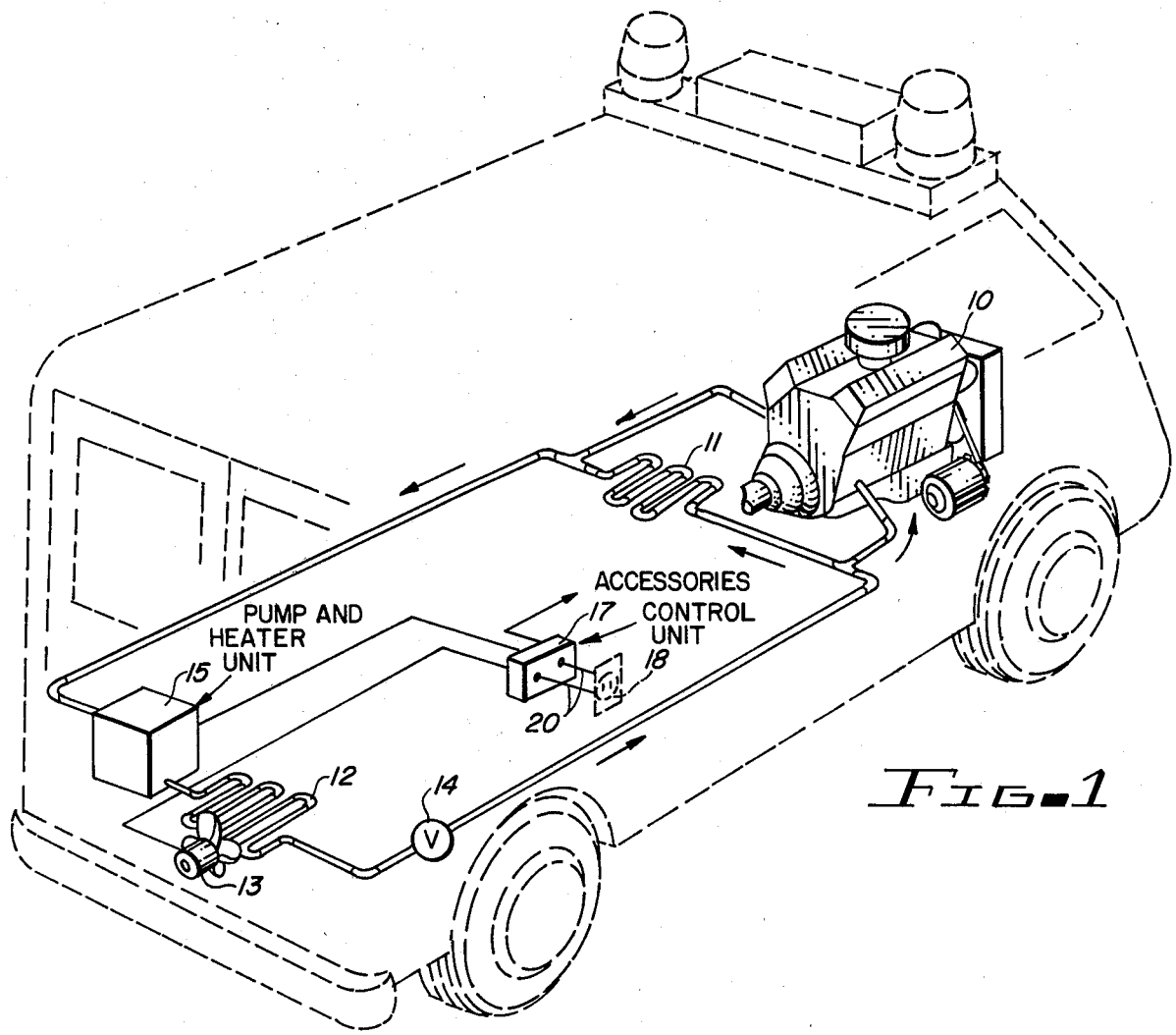
FIG. 1 is a diagrammatic perspective view of a preferred embodiment of the invention.
Figure 2:
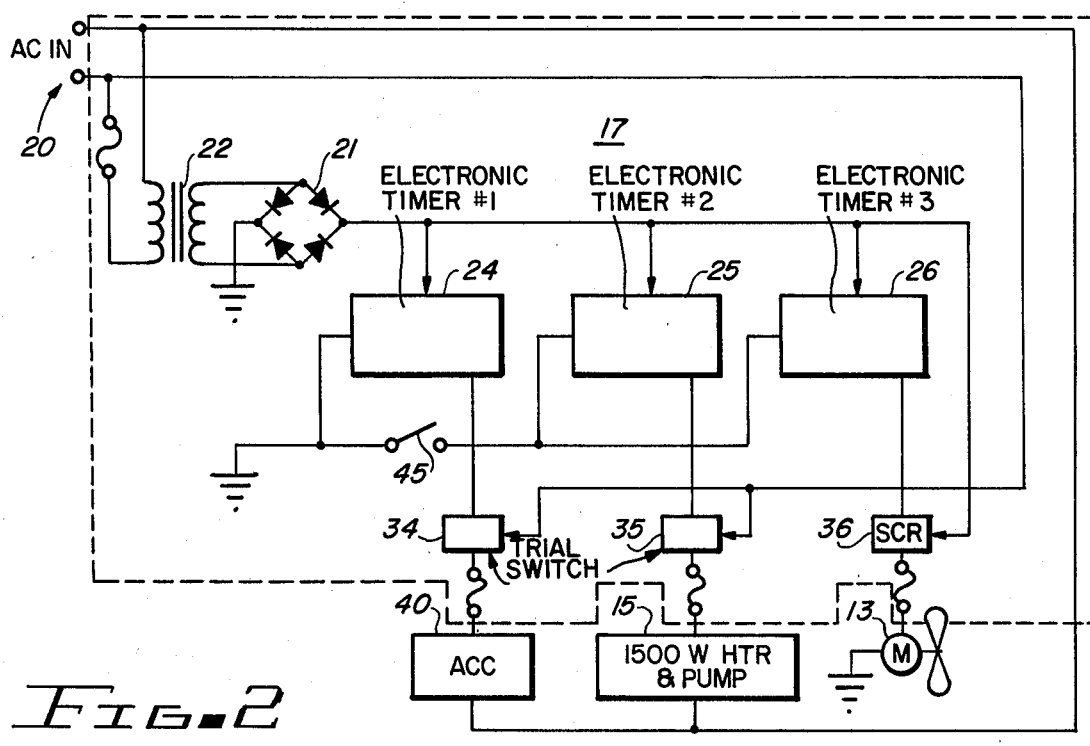
FIG. 2 is a schematic circuit diagram of a portion of the apparatus shown in FIG. 1.

Reference now should be made to the drawing in which the same reference numbers are used in both FIGS. 1 and 2 to designate the same or similar components. FIG. 1 illustrates in phantom dotted lines a perspective diagrammatic representation of a typical emergency vehicle, such as an ambulance. Such vehicles generally are powered by a water cooled internal combustion engine 10 in which a part of the engine coolant is passed through a recirculating front heater coil 11 generally located on the front fire wall of the vehicle. A fan (not shown) operated by a driver actuated switch is used to control the flow of air over the heater coil 11 to warm the front portion of the vehicle. The water circulation through the coil 11 is under the control of the conventional water pump associated with the engine 10 and may be accomplished in any well-known manner.

Emergency vehicles also include a parallel heater path with a rear heater coil 12 and a rear fan 13 for heating the rear portion of the vehicle, either in conjunction with or separately from the heat supplied by the front heater. This is represented in FIG. 1 by showing a parallel network of pipes passing to the rear of the vehicle to supply a portion of the vehicle coolant through a coil 12. The fan 13 passes air over the rear heat exchange coil 12 and normally is controlled by a switch on the dashboard of the vehicle. The fan 13 may be a single speed or variable speed fan of the type commonly employed with such heaters. A valve 14 is connected in the recirculating line for the rear heater, and this valve also is controlled by the driver; so that, at the driver's option, warm coolant may be either selectively passed through the coil 12 or blocked from flowing through the rear heater. This also is a conventional arrangement used in emergency vehicles, such as ambulances and fire department rescue vehicles, currently in widespread operation.

To provide for stand-by heating of the vehicle when it is parked for long periods of time in sub-freezing weather, the conventional system which has been described so far has been modified by placing a commercially available auxiliary electrical heater and pump combination 15 in the water line on the upstream side of the heater coil 12 at the rear of the vehicle. The particular design of the pump and the heater is not important. The heater in the unit 15 should be capable of warming the fluid in the coolant line to a level sufficient to provide enough heat from the coil 12 to permit heating of the vehicle interior when the fan 13 is energized. A low volume pump, drawing relatively little power, is ideal for this purpose. The heater in the unit 15 typically is a 1500 Watt heater, or the like, consuming relatively low amounts of power, considering the application in which it is used.

Power for operating the pump/heater 15 and for operating the fan 13 independently of the dashboard mounted controls in the vehicle is obtained from a control unit 17 mounted on the inside wall of the vehicle. The unit 17 has supply wires extending from it to the fan 13, the heater/pump 15, and to other electrically operated accessories which may be located either in the rear compartment or anywhere they may be conveniently placed in the arrangement of equipment employed within the emergency vehicle.

FIG. 2 is a circuit diagram of the electrical operating circuits for the auxiliary power supply and heater system diagrammatically illustrated in FIG. 1. Alternating current for operating the control unit 17 is obtained through a receptacle 18 mounted on the side of the vehicle. This receptacle is accessible from the vehicle exterior and accepts a standard alternating current household cord or plug, the other end of which is connected with a suitable source of conventional alternating current power (110 Volt, 60 cycle).

The control unit 17 has an alternating current input 20 which is connected to the receptacle 18 of FIG. 1. The input lines 20 are supplied with conventional 110 Volt, 60 cycle alternating current (in the United States). These lines are connected through a suitable coupling transformer 22 to a rectifier circuit 21, which is used to supply low voltage DC operating current to three timers, 24, 25 and 26, and to a silicon-controlled-rectifier (SCR) switch 36 connected in series between the output of the rectifier 21 and the input to the direct current fan 13 located in the vehicle. The only control circuit shown for the fan 13 is the one provided by the control unit 17. It is to be understood, however, that a parallel fan control circuit, operated from the vehicle dashboard in a conventional manner, also exists; so that the fan 13 may be operated in its normal fashion when the vehicle illustrated in FIG. 1 is in normal use. The circuit of FIG. 2 is employed as a stand-by auxiliary power supply for the fan 13 and the other components illustrated in FIG. 2.

The heater/pump 15 and the electrically operated vehicle accessories 40 both are connected in parallel across the alternating current output supplied from the control unit 17 and provided over the leads 20 through solid state switches 35 and 34, respectively. The switches 34 and 35 typically are triacs; and in a commercial implementation of the system, the switches 34 and 35 are 40 amp triacs.

When the receptacle 18 is first supplied with alternating current power, none of the utilization devices initially are energized. That is, the fan 13, the heater/pump 15, and the accessories 40 do not receive operating current at the time power first is applied through the receptacle 18 to the control unit 17. This is because the switches 34, 35 and 36 are not triggered into operation until respective electronic timer circuits, 24, 25 and 26 provide trigger pulses to the switches with which each of these timer switches is associated to trigger the switches into conduction. The timer circuits, 24, 25 and 26 also are selected to have different time-out periods, the lengths of which may vary in accordance with the particular operating conditions of the system. The time-out periods of the timers, 24, 25 and 26 are relatively short, but are selected to be sufficient to prevent any surge of power from taking place through the control unit 17 when it is first plugged into the operating alternating current. This prevents any sudden overloading of the circuit, to which the vehicle accessory stand-by system is connected, and also minimizes the potential of harm to the person making such a connection.

Each of the timers 24, 25 and 26 initially is enabled to begin its time-out cycle by the application of direct current operating power obtained from the rectifier 21. When the timer 24 times-out, a trigger pulse is applied to the triac 34 turning it on to permit alternating current to flow through the triac 34 and a current limiting fuse to the accessory package 40. Similarly, when the timer 25 times-out, the triac 35 is triggered into conduction; so that the alternating current power available on the leads 20 flows through the heater/pump unit 15. Finally, when the timer unit 26 times-out, the silicon-controlled-rectifier (SCR) 36 is triggered into conduction to apply direct operating current through the motor of the fan 13 to turn it on.

When the heater/pump unit 15 is in operation, warm water is circulated throughout the entire vehicular cooling system, including the engine 10. Consequently, the engine 10 is maintained at an elevated temperature to facilitate starting the engine, even when the vehicle is parked outside in sub-zero weather. Since the heated water in the heater/pump unit 15 first passes through the heater coil 12 at the rear of the vehicle, the warmest water is present in the heat exchange coil 12. Then when the fan 13 moves air across the coil 12, the air is warmed in a conventional fashion and disbursed to the interior of the vehicle in a highly efficient manner. This maintains the vehicle interior at a temperature above the freezing point and prevents damage to various solutions which are stored in the vehicle, particularly if it is an ambulance or fire department emergency vehicle. After leaving the coil 12, the heated fluid passes through the remainder of the engine coolant/heating system to the engine 10 and through the cooling system of the engine 10 to maintain the temperature of the engine at an elevated temperature to facilitate its starting.

It should be noted that the existing vehicle rear heater 12, which is commonly employed in ambulances and emergency vehicles, is the same heater which is used in this auxiliary heating system. The engine coolant or water simply is recirculated through the entire system, including the engine, by means of the auxiliary pump 15 operated by the control unit 17. The fan 13 is the standard fan already used in the vehicle for the rear heater. Obviously, if front and rear heating systems are not employed in a particular vehicle, the same system can be used with a single front heater in the same manner described.

Power for operating the medical accessories, either charging battery packs in them, or keeping them energized in a stand-by condition, is obtained in a conventional manner from the control unit 17 and applied by means of the accessories output to the accessory utilization devices 40 illustrated in FIG. 2. If some accessory utilization devices are operated by direct current instead of alternating current as shown in FIG. 2, a silicon controlled rectifier switch such as the switch 36 may be employed with an additional timer circuit to provide the necessary operating current to such direct current operated accessories.

It also may be desirable for some applications to employ an auxiliary trickle charger for the vehicle battery. This also can be obtained as another output of the control unit 17, if desired.

Since part of the function of the control unit 17 is to provide stand-by power to the accessories within the vehicle, it may be desirable to use the auxiliary circuit connection in the vehicle even in the summertime. If this is the case, a switch 45 (a summer/winter switch) is opened to disable the timers 25 and 26. This, in turn, prevents the switches 35 and 36 from being closed; so that the heater 15 and the fan 13 are not operated. During the wintertime, the switch 45 is closed to permit operation of both the heater 15 and the fan 13 in the manner described above.

Various modifications will occur to those skilled in the art without departing from the true scope of this invention. It should be noted that the control unit 17 is a compact control unit in which all of the timers and solid state or electronic switches are located. The system requires no power whatsoever from the vehicle electrical system because all of the necessary alternating current and direct current power outputs are produced and controlled within the control unit 17 itself. This is in contrast with prior art devices, many of which rely extensively upon the vehicle battery for operation.

While the preferred embodiment has been described particularly as used in an ambulance or emergency vehicle, the invention also may be employed in large semi-trailer tractors. In the past, it has been the practice to leave the engines of such tractors running overnight to avoid starting problems and to maintain interior comfort in the cab. That no longer is necessary when the system described above is installed.

I claim:

1. In a fluid-cooled motor vehicle having a heating system comprised of a heat exchanger for heating the vehicle interior and a recirculating fluid line interconnecting the heat exchanger and the engine coolant supply and having an electric heater fan controlled by a standard vehicle heater fan control for moving air across the heat exchanger, the improvement comprising a stand-by heating/power supply system including in combination:

an auxiliary electric heater and pump connected in series in the recirculation coolant line adjacent the heat exchanger in the vehicle interior, said pump operating to circulate coolant from said auxiliary electric heater first into the heat exchanger in said coolant line and from the heat exchanger to recirculate coolant throughout the entire motor vehicle cooling system so long as said pump is operating;

an auxiliary fan control connected to said heater fan for operating said heater fan independently of the standard vehicle fan control;

electrically operated auxiliary accessories in the motor vehicle interior; and a control unit mounted in the vehicle and adapted for connection with an electrical power source external to the motor vehicle and having a plurality of outputs respectively connected with said electrically operated accessories, said auxiliary electric heater and pump, and with said auxiliary fan control to maintain said auxiliary accessories in a stand-by operating condition and for operating said auxiliary electric heater, pump and auxiliary fan control when said motor vehicle is inoperative and said control unit is connected with the external power source.

2. The combination according to claim 1 wherein said control unit includes a delay timer switch connected between the external power source and each of the outputs coupled with said auxiliary accessories, said auxiliary fan control and said auxiliary electric heater and pump so that electric power is obtained from the outputs of said control unit at different predetermined time periods after interconnection of said control unit with the external power source.

3. The combination according to claim 2 wherein each of said delay timer switches includes timer means and separate switching means connected in circuit between each of said auxiliary electrically operated accessories, said auxiliary electric heater and pump, and said auxiliary fan control, and said respective outputs therefor; and said timer means are initiated into operation upon connection of said control unit with said external power source and are coupled to said switching means for closing said switching means at different predetermined time intervals.

4. The combination according to claim 3 wherein said switching means comprise solid state switches and said timer means comprise electronic time circuits.

5. The combination according to claim 4 further including means for selectively disabling different ones of said timer means from operation irrespective of the connection of said control unit with the external power source.

6. The combination according to claim 1 wherein the motor vehicle is an emergency vehicle having a rear heating system connected in parallel with a conventional front heating system of the vehicle and wherein the heat exchanger comprises the rear heat exchanger of such emergency vehicle; said auxiliary electric heater and pump is located in the coolant line adjacent said rear heat exchanger immediately on the upstream side thereof to deliver heated coolant first to the heat exchanger, said coolant being circulating throughout the vehicle heating and cooling system to thereby provide heated coolant to the engine of the vehicle as well as to the heat exchanger of the vehicle rear heater.

7. The combination according to claim 1 further including means for selectively disabling said auxiliary electric heater and pump and said auxiliary fan control irrespective of the connection of said control unit with the external power source.

* * * * *